US011066995B2

United States Patent
Sykes et al.

(10) Patent No.: US 11,066,995 B2
(45) Date of Patent: Jul. 20, 2021

(54) GAS TURBINE WITH OIL WARMING ANTI-ICE CIRCUIT

(71) Applicant: United Technologies Corporation, Farmington, CT (US)

(72) Inventors: Richard L. Sykes, Colchester, CT (US); Christopher D. Ramsey, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 374 days.

(21) Appl. No.: 15/980,186

(22) Filed: May 15, 2018

(65) Prior Publication Data

US 2019/0353101 A1  Nov. 21, 2019

(51) Int. Cl.
| | |
|---|---|
| *F02C 7/047* | (2006.01) |
| *F02C 7/32* | (2006.01) |
| *F02C 7/20* | (2006.01) |
| *F02C 3/00* | (2006.01) |

(52) U.S. Cl.
CPC ............... *F02C 7/047* (2013.01); *F02C 7/20* (2013.01); *F02C 7/32* (2013.01); *F02C 3/00* (2013.01)

(58) Field of Classification Search
CPC .... F02C 7/047; F02C 7/14; B64D 2033/0233; F01D 25/02; F01D 25/18; F05D 2260/98
See application file for complete search history.

(56) References Cited

U.S. PATENT DOCUMENTS

| | | | | |
|---|---|---|---|---|
| 2,435,990 | A * | 2/1948 | Weiler | F02C 7/047 60/267 |
| 2,718,350 | A * | 9/1955 | Burgess | F02C 7/047 415/104 |
| 3,978,656 | A | 9/1976 | Murphy | |
| 4,696,156 | A * | 9/1987 | Burr | F01D 25/18 60/39.08 |
| 4,831,819 | A * | 5/1989 | Norris | B64D 15/22 244/134 R |
| 4,860,534 | A * | 8/1989 | Easley | F02C 7/047 60/39.092 |
| 8,205,426 | B2 | 6/2012 | Schilling | |
| 9,869,203 | B2 | 1/2018 | Thise | |
| 2009/0014245 | A1* | 1/2009 | Shevchenko | G01N 33/2858 184/6.4 |

(Continued)

OTHER PUBLICATIONS

EP search report for EP19162624.1 dated Feb. 11, 2020.

*Primary Examiner* — Todd E Manahan
*Assistant Examiner* — Todd N Jordan
(74) *Attorney, Agent, or Firm* — Getz Balich LLC

(57) ABSTRACT

Disclosed is an inlet system for a gas turbine engine that extends along a longitudinal axial centerline, the inlet system comprising: an inner dome, a shroud located axially aft and radially outward of the inner dome with respect to the centerline, a splitter nose located radially inward of the shroud with respect to the centerline, a first plurality of struts radially disposed between the shroud and the splitter nose with respect to the centerline, a second plurality of struts radially disposed between the splitter nose and a bearing with respect to the centerline, a plurality of inlet guide vanes radially disposed between the splitter nose and the bearing with respect to the centerline, and the plurality of inlet guide vanes axially aft of the plurality of second struts with respect to the centerline.

7 Claims, 7 Drawing Sheets

(56) References Cited

U.S. PATENT DOCUMENTS

| | | | |
|---|---|---|---|
| 2009/0165995 A1* | 7/2009 | Bajusz | F28F 1/34 |
| | | | 165/51 |
| 2015/0330305 A1 | 11/2015 | Tall, Jr. | |
| 2016/0131036 A1 | 5/2016 | Bintz | |
| 2017/0130606 A1 | 5/2017 | Niergarth et al. | |

* cited by examiner

GAS TURBINE WITH OIL WARMING ANTI-ICE CIRCUIT

STATEMENT REGARDING FEDERALLY SPONSORED RESEARCH OR DEVELOPMENTS

This invention was made with Government support under W58RGZ-16-C-0046 awarded by the United States Army. The Government has certain rights in this invention.

BACKGROUND

Engines, such as those which power aeronautical and industrial equipment, may employ a compressor to compress air that is drawn into the engine and a turbine to capture energy associated with the combustion of a fuel-air mixture. Engines are frequently required to operate over a wide range of environmental conditions, such as for example over a wide temperature range. Components of the engine, such as for example an inlet particle separator, inlet case, inlet guide vanes, etc., may be subject to icing at various environmental conditions. For example, ice may form on/adhere to one or more surfaces of the components based on a given temperature, pressure, and/or altitude at which the engine is operating or located. Ice may have an impact on engine aerodynamics, such that a change (e.g., a loss) in engine performance may be experienced due to icing. Accordingly, anti-icing/de-icing systems are used to reduce the likelihood of ice from forming/collecting on components of the engine.

In conventional engine platforms, bleed air is routed from the compressor to the inlet components to reduce the likelihood of icing. However, in some engines the bleed air may be inadequate in terms of one or more parameters/qualities (e.g., temperature, pressure, amount, volume, etc.) to provide sufficient anti-icing (e.g., anti-icing in an amount greater than a threshold). Still further, the use of bleed air can degrade engine performance in terms of one or more metrics, such as for example a maximum shaft horsepower that is available. For example, the use of bleed air for anti-icing purposes may result in a reduction of an output engine power/thrust capability.

Accordingly, what is needed is an ability to provide for enhanced anti-icing capability/functionality without substantially degrading the performance (e.g., output power/thrust) of an engine.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a gas turbine engine comprising: a tank, a conduit in fluid communication with the tank, a first strut in fluid communication with the conduit, a splitter nose in fluid communication with the first strut, a second strut in fluid communication with the splitter nose, and a shroud in fluid communication with the second strut and the tank. In some embodiments, the tank includes oil. In some embodiments, the conduit, the first strut, the splitter nose, the second strut, and the shroud convey the oil to warm at least one surface of each of the first strut, the splitter nose, the second strut, and the shroud. In some embodiments, the gas turbine engine further comprises: a compressor section, and an inner dome. In some embodiments, the gas turbine engine further comprises: a second conduit, and a valve disposed in the second conduit. In some embodiments, the compressor section includes an inlet guide vane, and when the valve is open air from the compressor section is provided to the inner dome and the inlet guide vane to warm the inner dome and the inlet guide vane. In some embodiments, the splitter nose at least partially defines a scavenge stream and a core stream of the gas turbine engine. In some embodiments, the gas turbine engine further comprises: at least one cooler fluidly coupled to the tank, a gearbox fluidly coupled to the at least one cooler, a sump fluidly coupled to the at least one cooler, a debris monitor fluidly coupled to the gearbox and the sump, a filter fluidly coupled to the debris monitor and the conduit. In some embodiments, the sump includes a bearing. In some embodiments, at least one cooler includes an air-oil cooler and a fuel-oil cooler.

Aspects of the disclosure are directed to an inlet system for a gas turbine engine that extends along a longitudinal axial centerline, the inlet system comprising: an inner dome, a shroud located axially aft and radially outward of the inner dome with respect to the centerline, a splitter nose located radially inward of the shroud with respect to the centerline, a first plurality of struts radially disposed between the shroud and the splitter nose with respect to the centerline, a second plurality of struts radially disposed between the splitter nose and a bearing with respect to the centerline, a plurality of inlet guide vanes radially disposed between the splitter nose and the bearing with respect to the centerline, and the plurality of inlet guide vanes axially aft of the plurality of second struts with respect to the centerline. In some embodiments, the splitter nose splits a flow into a scavenge stream that conveys a foreign object and a core stream that substantially conveys air. In some embodiments, the inlet system further comprises: a tank, and a conduit fluidly coupled to the tank and at least one of the first plurality of struts, where the splitter nose is fluidly coupled to the at least one of the first plurality of struts, where at least one of the second plurality of struts is fluidly coupled to the splitter nose, and where the shroud is fluidly coupled to the at least one of the second plurality of struts and the tank. In some embodiments, the tank includes an oil tank. In some embodiments, the shroud abuts the oil tank. In some embodiments, the inlet system further comprises: a conduit fluidly coupled to a compressor section of the gas turbine engine, and a valve disposed in the conduit, where when the valve is open air from the compressor section is provided to the inner dome and the plurality of inlet guide vanes to warm the inner dome and the plurality of inner guide vanes. In some embodiments, the inlet system further comprises: an inlet case that contains the inner dome, the shroud, the splitter nose, the first plurality of struts, and the second plurality of struts. In some embodiments, at least one of the inlet case or the shroud includes a plurality of fins. In some embodiments, each of the inner dome, the shroud, the splitter nose, and the plurality of inlet guide vanes includes aluminum.

BRIEF DESCRIPTION OF THE DRAWINGS

The present disclosure is illustrated by way of example and not limited in the accompanying figures in which like reference numerals indicate similar elements. The figures are not necessarily drawn to scale unless explicitly indicated otherwise.

DETAILED DESCRIPTION

Figure 1:
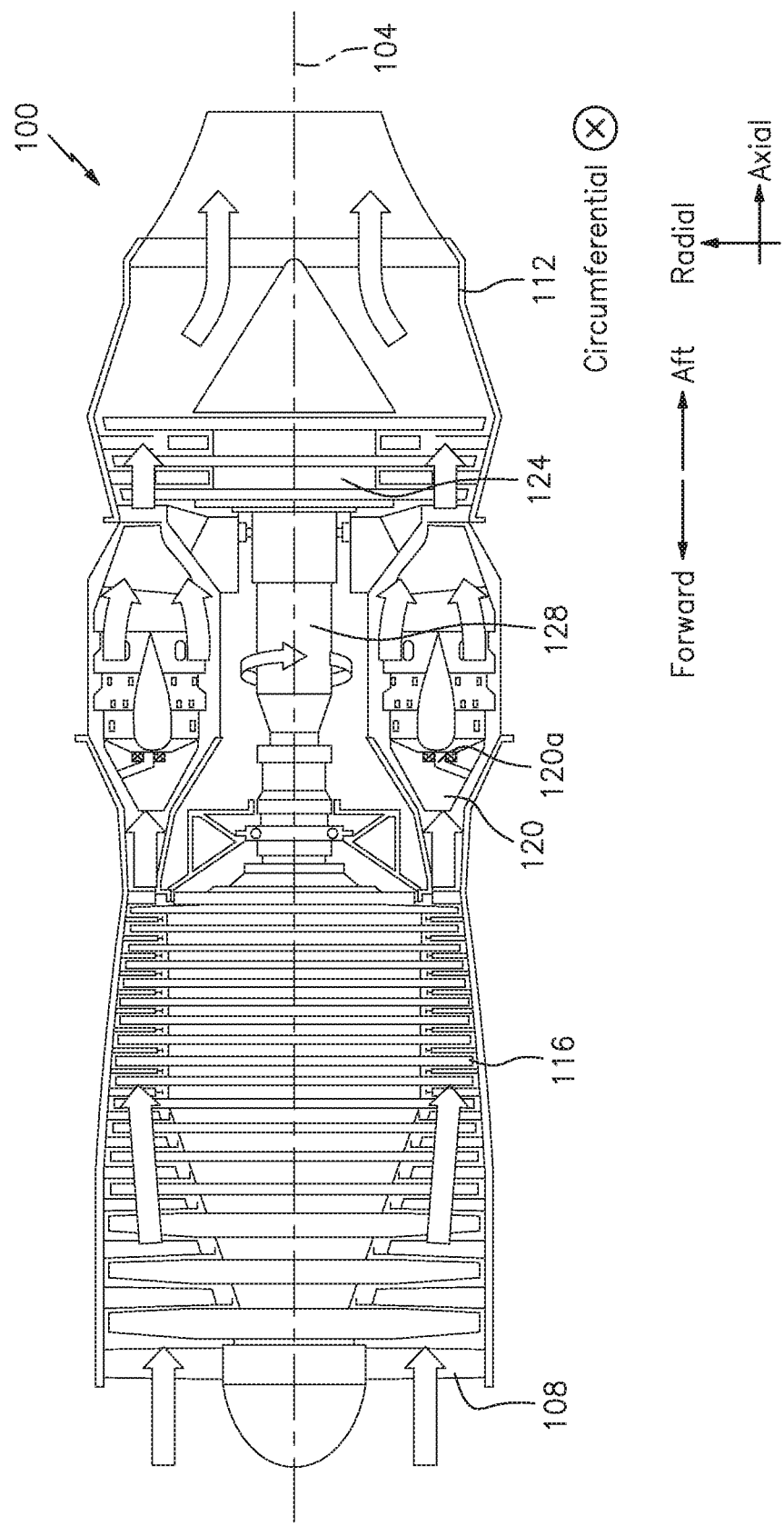
FIG. 1 is a side cutaway illustration of a gas turbine engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities and/or a space/gap between entities.

Aspects of the disclosure may be applied in connection with an engine. FIG. 1 is a side cutaway illustration of an axial flow turbojet engine 100. The engine 100 may extend along a longitudinal axial centerline 104 between an upstream/forward airflow inlet 108 and a downstream/aft airflow exhaust nozzle 112. The engine 100 may include a compressor section 116, a combustor section 120, and a turbine section 124.

During operation, air may enter the engine 100 through the inlet 108 where it may be compressed by the compressor section 116. The compressed air may be provided to the combustor section 120. In the combustor section 120, the compressed air may be mixed with fuel provided by one or more fuel nozzles 120a and ignited to power the engine 100. The output of the combustor section 120 may be provided to the turbine section 124. The turbine section 124 may extract energy from the output of the combustor section 120 to drive the compressor section 116 via a rotation of a shaft 128 that couples (e.g., mechanically couples) the compressor section 116 and the turbine section 124. The combusted fuel-air mixture may be exhausted via the nozzle 112.

FIG. 1 represents one possible configuration for an engine. Aspects of the disclosure may be applied in connection with other environments, including additional configurations for engines. For example, aspects of the disclosure may be applied in connection with turbofan engines, turboprops, turboshafts, etc.

Figure 1A:
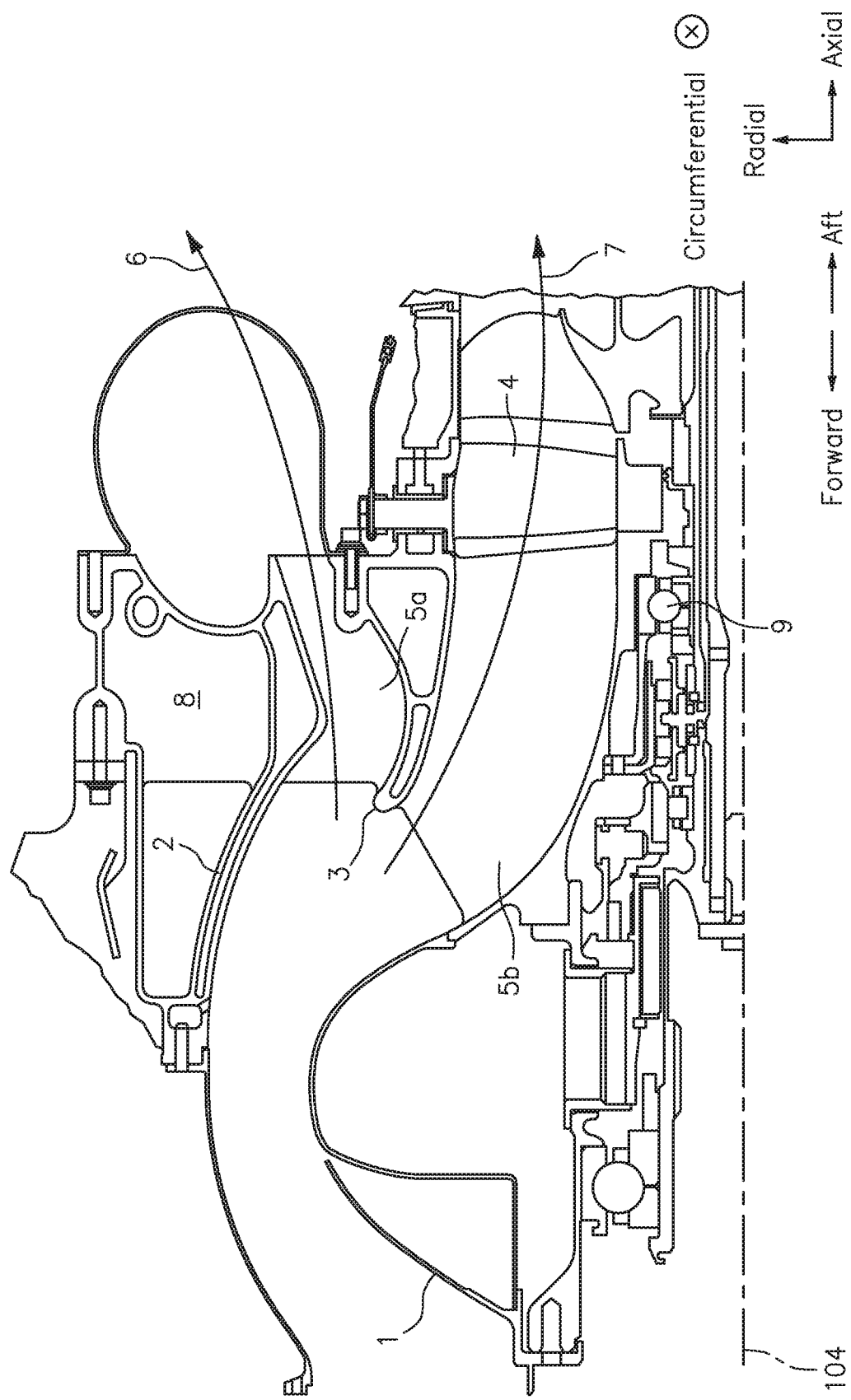
FIG. 1A illustrates an inlet of an engine in accordance with aspects of this disclosure.

An inlet of an engine (e.g., the inlet 108 of the engine 100 of FIG. 1) may include one or more components/devices that may be subjected to potential icing. By way of introduction, FIG. 1A illustrates such components as an inner dome 1, a shroud 2 (also referred to herein as an aft shroud), a splitter nose 3, one or more inlet guide vanes 4, one or more outer/scavenge struts 5a, and one or more inner/core struts 5b. One or more of the aforementioned components may be included as part of an inlet case, such as for example the inlet case 300 shown in FIG. 3.

During engine operation, air and potentially foreign objects/debris—e.g., sand, dirt, etc., may enter the inlet dome 1 and flow axially aft. The splitter nose 3 may separate the air from any foreign objects, such that the foreign objects may continue to flow aft as part of a scavenge stream 6. As shown, the scavenge stream 6 may be defined radially outward/outboard of the splitter nose 3 and radially inward/inboard of the aft shroud 2. The air that is substantially free of any foreign objects may continue to flow aft from the splitter nose 3 as part of a core stream 7, ultimately reaching the inlet guide vanes 4. As shown in FIG. 1A, the core stream 7 may be defined radially inward/inboard of the splitter nose 3.

The struts 5a and 5b may be distributed around the circumference of the engine. For example, four of each of the struts 5a and 5b may be distributed around the circumference of the engine in some embodiments. In some embodiments, the struts may be equidistantly spaced from one another. For example, each strut may be separated from the next adjacent strut by 360/N degrees, where N is the number of struts of a given type that are included in the engine.

Figure 3:
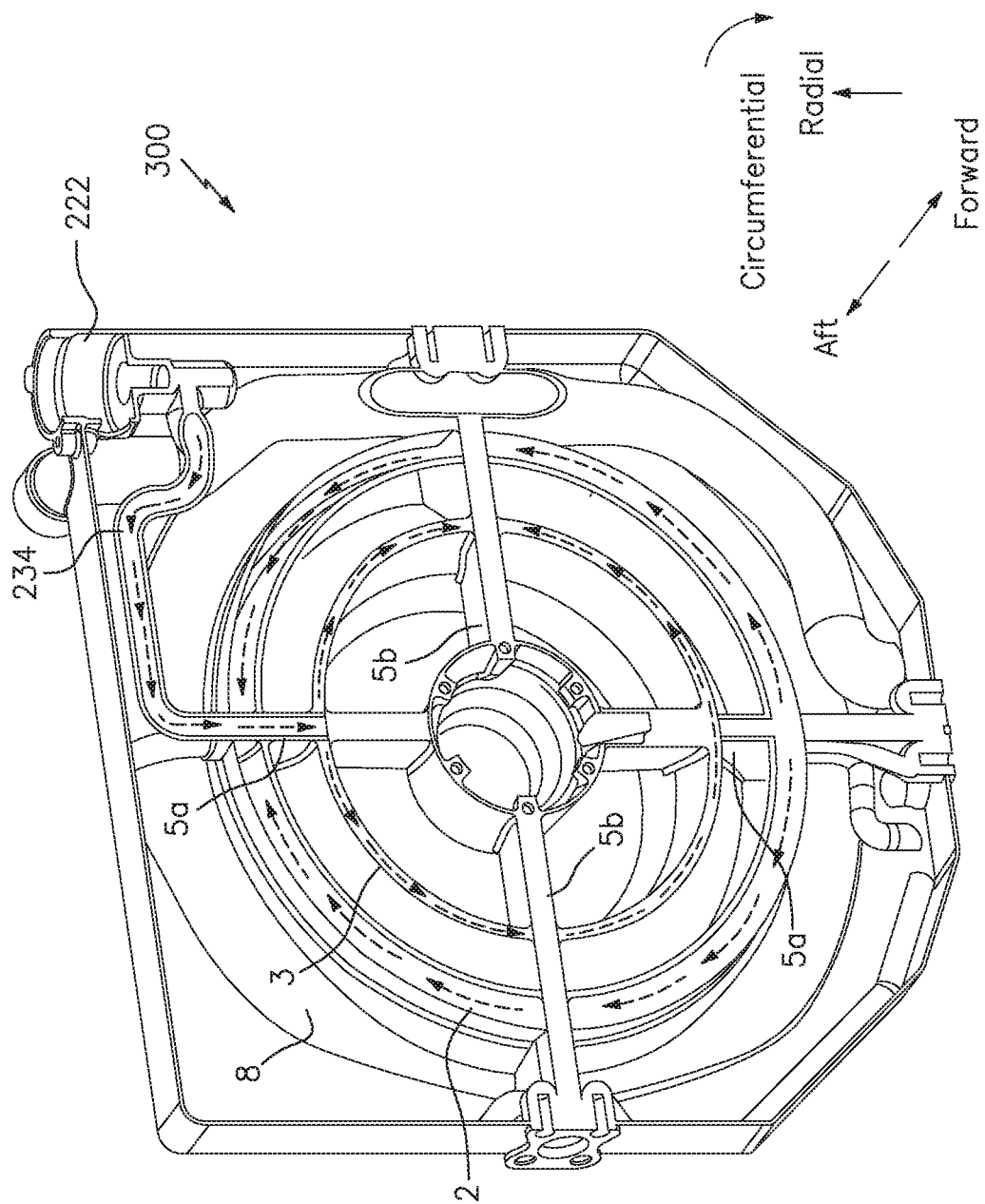
FIG. 3 illustrates an inlet case in accordance with aspects of this disclosure.

The struts 5a and 5b may provide structural support for the components shown in FIGS. 1A and 3. Additionally, at least some of the struts 5a and 5b may be included as part of an oil circuit/system as is described in further detail below.

An oil tank 8 may be used as a reservoir/storage for oil that may be used as part of the engine. The aft shroud 2 may border the oil tank 8 and may serve as a boundary/wall of the oil tank 8 in some embodiments. The proximity of the aft shroud 2 to the oil tank 8 may serve to warm the aft shroud 2, such that the aft shroud 2 may be subject to anti-icing due to the location of the aft shroud 2 relative to the oil tank 8. In other words, no active anti-icing techniques may need to be applied to the aft shroud 2 to anti-ice the aft shroud 2 in some embodiments.

Figure 2A:
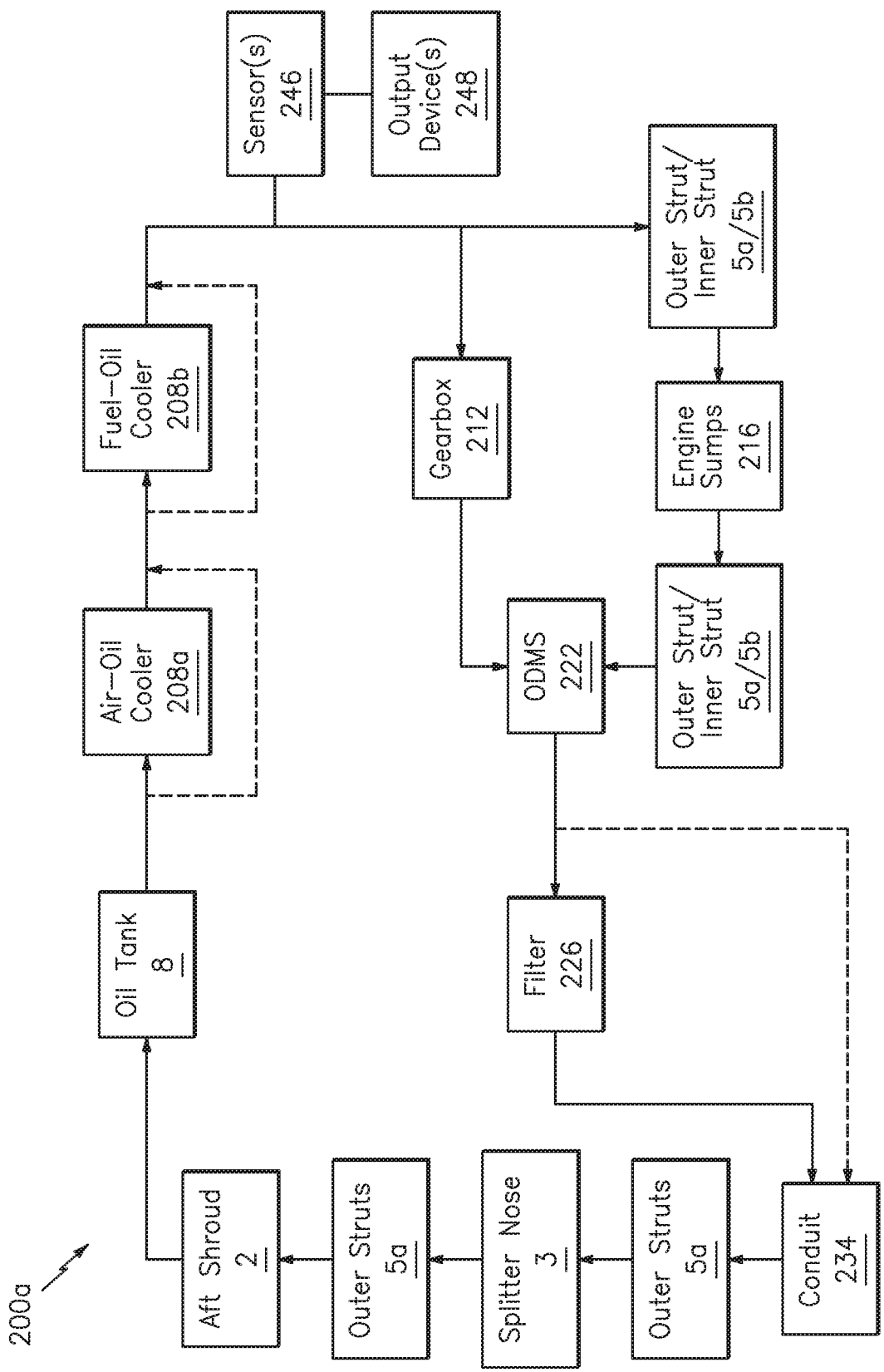
FIG. 2A illustrates an oil system in accordance with aspects of this disclosure.

FIG. 2A illustrates an oil system/circuit 200a that may be included as part of an engine. The oil system 200a may include the oil tank 8. The oil tank 8 may supply oil to an air-oil cooler 208a and/or a fuel-oil cooler 208b. The coolers 208a and 208b may change (e.g., reduce) the temperature of the oil relative to the temperature of the oil in the tank 8.

The oil that is output by the cooler 208a and/or the cooler 208b may be provided to, e.g., a gearbox 212 and/or one or more engine sumps 216. For example, the oil may be provided to the engine sumps 216 via one or more outer struts 5a and/or one or more inner struts 5b. In some embodiments, the engine sumps 216 may include one or more bearings (e.g., bearing 9 of FIG. 1A) that may provide support for rotational hardware of the engine.

The oil output from the gearbox 212 and the sumps 216 may be provided to an oil debris monitor system (ODMS) 222. The oil output from the engine sumps 216 may be provided to the ODMS 222 via an outer strut 5a and/or an inner strut 5b as shown in FIG. 2A. The ODMS 222 may check/monitor for debris/foreign objects that may be present in the oil that is provided to/received by the ODMS 222.

The oil that is output by the ODMS 222 may traverse a filter 226. The filter 226 may include one or more screens that may be used to eliminate debris/foreign objects that may be present in the oil.

The oil that is output by, e.g., the filter 226 may be provided (via a conduit 234) to the outer struts 5a. For example, the oil that is output by the filter 226 may be provided to the outer struts 5a in respect of an entrance of an inlet case (e.g., inlet case 300 of FIG. 3). From the outer struts 5a, the oil may be provided to the splitter nose 3, one or more additional outer struts 5a (where the additional outer struts 5a may be defined with respect to an exit of the inlet case 300), and the aft shroud 2 before being returned to the oil tank 8.

In FIG. 2A, bypass flowpaths for the oil are shown via dashed lines. For example, the oil from the oil tank 8 may bypass the air-oil cooler 208a and be provided to the fuel-oil cooler 208b. Similarly, the oil that is provided by the ODMS 222 may bypass the filter 226 and flow to the outer struts 5a. In some embodiments, bypass flowpaths may be provided to ensure a flow of oil in the event that a particular component/device becomes inoperable.

The flow/circulation of oil in the system 200a may be used to provide anti-icing with respect to, e.g., the struts 5a/5b, the splitter nose 3, and the aft shroud 2.

The system 200a may include one or more sensors 246 that may measure a characteristic/parameter associated with the oil. For example, the sensors 246 may measure the temperature and/or pressure of the oil and provide a status regarding the same to one or more output devices 248. The output devices 248 may include a speaker, a siren, a display panel, etc. The output devices 248 may present the status provided/indicated by the sensors 246.

The arrangement of the components in the system 200a is illustrative. In some embodiments, the flow of oil may be different relative to the arrangement shown in FIG. 2A. For example, in some embodiments the filter 226 may be located upstream of the ODMS 222 with respect to the flow of oil.

Figure 3A:
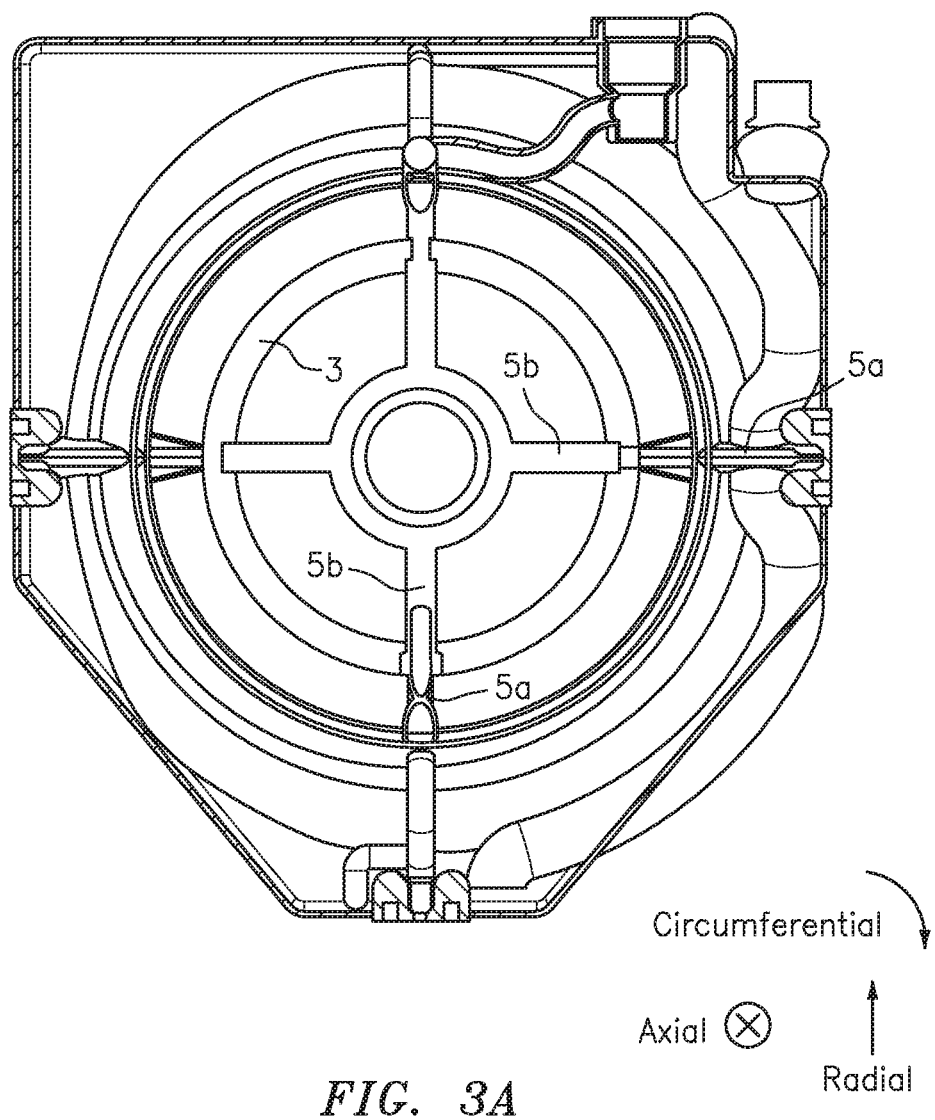
FIG. 3A illustrates a circulation of oil in respect of struts in conjunction with an inlet case.

Referring to FIG. 3A, a (portion of a) flow of oil about an inlet case (e.g., inlet case 300 of FIG. 3) is shown in respect of struts and a sump (e.g., struts 5a/5b and sump 216 of FIG. 2A). For example, as shown in FIG. 3A (which represents a view taken from the perspective of forward-looking-aft) oil may enter the sump via the outer strut 5a and the inner strut 5b located at the 3 o'clock position and may exit/be drained from the sump via the inner strut 5b and the outer strut 5a located at the 6 o'clock position.

In connection with FIGS. 3 and 3A, oil may be circulated through an inlet case (e.g., inlet case 300 of FIG. 3) multiple times. For example, in some embodiments oil may be circulated through the inlet case two times before being returned to its origin (e.g., the oil tank 8 of FIGS. 1A and 2A).

As described above in connection with FIGS. 1A, 2A, 3, and 3A, the splitter nose 3 may be used to circulate oil. In some embodiments, a channel of the splitter nose 3 used in the circulation of the oil may be manufactured via a casting operation.

Components described herein may serve as a heat sink with respect to oil. For example, a fuel-oil cooler (e.g., fuel-oil cooler 208b of FIG. 2A) may be mounted to (e.g., may be mounted on top of) an inlet case (e.g., inlet case 300 of FIG. 3) wholly external to a sump/oil tank (e.g., oil tank 8 of FIGS. 1A and 2A).

Figure 4:
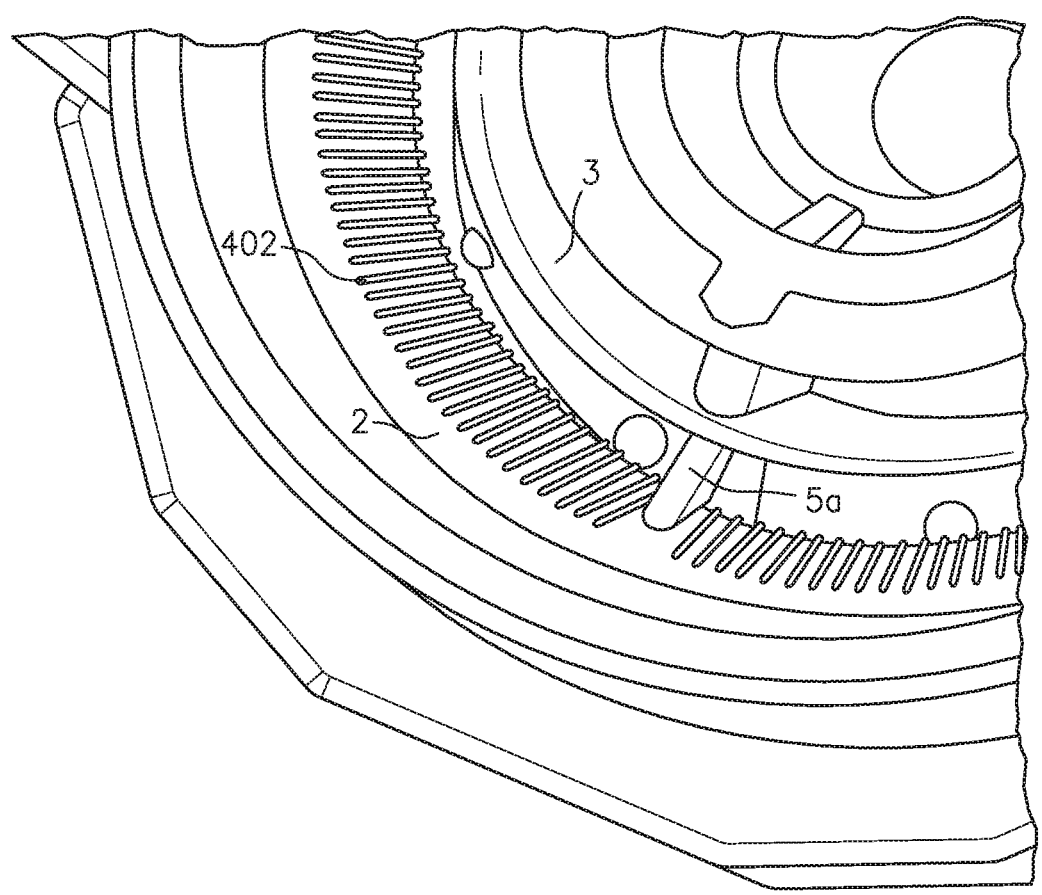
FIG. 4 illustrates fins located on a component (e.g., an aft shroud) in accordance with aspects of this disclosure.

In some embodiments, fins may be located on a component (e.g., the inlet case 300 of FIG. 3) to transfer heat from the oil to scavenge air (e.g., scavenge stream 6 of FIG. 1A) for anti-icing purposes. FIG. 4 illustrates an embodiment where fins 402 are located on the aft shroud 2 to facilitate heat transfer.

In some embodiments, the splitter nose 3 may be a separate component from, e.g., the oil tank 8 and may be used in conjunction with a thermal exchange (e.g., heat transfer) relationship.

The oil tank 8 (see FIGS. 1A and 2A) may collect oil scavenged from compartments throughout an engine, such as for example from a bearing that is integral with, e.g., the inlet case.

Figure 2B:
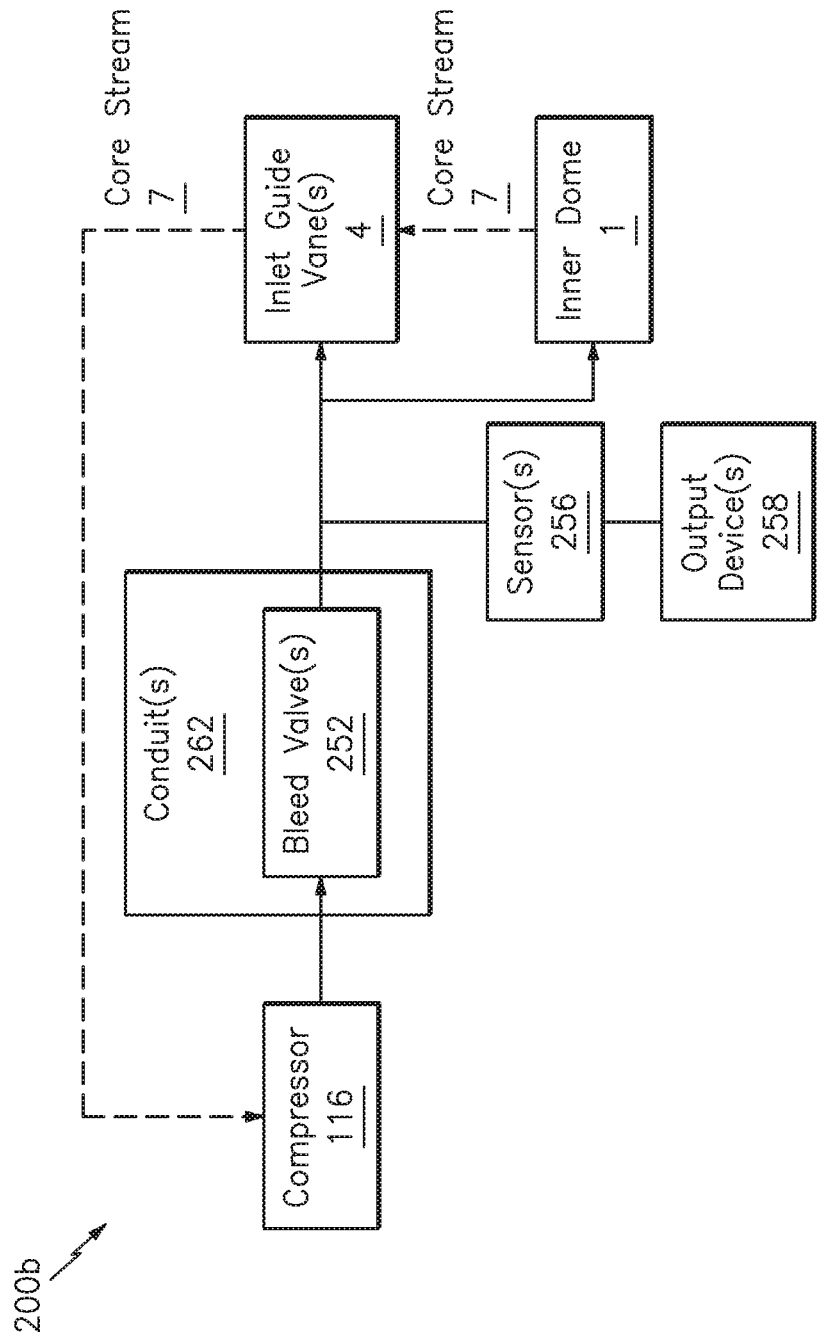
FIG. 2B illustrates an air system in accordance with aspects of this disclosure.

FIG. 2B illustrates an air system/circuit 200b that may be included as part of an engine. The air system 200b may include the compressor section 116. A portion of the airflow through the compressor section 116 may be provided to one or more bleed valves 252 included in one or more conduits 262. The bleed valves 252 may be selectively opened to provide air from the compressor section 116 to the inner dome 1 and/or the inlet guide vanes 4 via the conduit 262. For example, the bleed valves 252 may be opened during anti-icing operations and closed otherwise.

At least a portion of the bleed air provided to the inner dome 1 may, in turn, be provided to the inlet guide vanes 4 via the core stream 7. The air from the inlet guide vanes 4 may be returned to the compressor section 116 via the core stream 7. In this respect, warm bleed air from the compressor section 116 may be used for anti-icing purposes with respect to the inner dome 1 and the inlet guide vanes 4.

The inner dome 1 shown in FIG. 2B is representative of one example of a static structure that may receive bleed air. Bleed air may be supplied to various static structures (e.g., cases) for anti-icing purposes in accordance with aspects of this disclosure.

The system 200b may include one or more sensors 256 that may measure a characteristic/parameter associated with the air. For example, the sensors 256 may measure the temperature and/or pressure of the air. The sensors 256 may provide an indication of whether the bleed valve(s) 252 are operative. The sensors 256 may provide status/output to one or more output devices 258. The output devices 258 may include a speaker, a siren, a display panel, etc. The output devices 258 may present the status provided/indicated by the sensors 256. The output devices 258 may correspond to the output devices 248 of FIG. 2A.

To the extent that oil is provided to a component (e.g., the aft shroud 2, the splitter nose 3, the struts 5a/5b) for anti-icing purposes, a size/dimension of a wall of the component may be selected to ensure that ice does not form on that component (or forms in an amount that is less than a threshold). For example, a wall thickness of the component may be selected such that heat/thermal energy that is resident/contained within the wall can traverse/penetrate the wall and warm the exterior surfaces of the wall (e.g., the surfaces of the wall on which ice may have a tendency to accumulate). The material that is included as part of the component may influence the selection of the size/dimension of the wall. For example, in some embodiments a component of an engine (e.g., a component of the inlet case 300 of FIG. 3) may include one or more metals (e.g., aluminum, titanium, steel, and/or one or more metal alloys thereof). Temperature characteristics associated with the material (e.g., metal) may influence the design/selection of the wall thickness.

Aspects of the disclosure may be used to provide anti-icing with respect to one or more surfaces of a component of an engine. For example, a forward/leading edge of a given component may be prone to icing, such that anti-icing techniques described herein may reduce, or even completely eliminate, ice formation on the forward edge. The anti-icing techniques may increase a temperature associated with (a wall/skin of) the component, such that the (wall/skin of the) component is warmed. A warmer component (wall/skin) is less susceptible to icing than a colder component (wall/skin).

Aspects of the disclosure may be used to strike a balance between various competing factors/criteria in engine design, such as for example complexity, weight, and cost. For example, aspects of the disclosure may combine the use of compressor bleed air and oil to provide anti-icing with respect to components of an engine to achieve such a balance.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A gas turbine engine comprising:
   an airflow path;
   a tank including oil;
   an oil conduit in fluid communication with the tank;
   a first outer strut in fluid communication with the oil conduit;
   a splitter nose in fluid communication with the first outer strut;
   a second outer strut in fluid communication with the splitter nose; and
   a shroud in fluid communication with the second outer strut and the tank;
   wherein the splitter nose is configured to divide the airflow path into a scavenge stream path and a core stream path;
   wherein, during operation of the gas turbine engine, the oil flows sequentially from the tank through the oil conduit through the first outer strut though the splitter nose though the second outer strut through the shroud then returns to the tank;
   wherein at least one surface of each of the first outer strut, the splitter nose, the second outer strut, and the shroud is configured to be warmed by the oil.

2. The gas turbine engine of claim 1, further comprising:
   a compressor section; and
   an inner dome.

3. The gas turbine engine of claim 2, further comprising:
   an air conduit; and
   a bleed valve disposed in the air conduit.

4. The gas turbine engine of claim 3, wherein the compressor section includes an inlet guide vane, and wherein when the bleed valve is open air from the compressor section is provided to the inner dome and the inlet guide vane to warm the inner dome and the inlet guide vane.

5. The gas turbine engine of claim 1, further comprising:
   at least one cooler fluidly coupled to the tank;
   a gearbox fluidly coupled to the at least one cooler;
   a sump fluidly coupled to the at least one cooler;
   a debris monitor fluidly coupled to the gearbox and the sump;
   a filter fluidly coupled to the debris monitor and the conduit.

6. The gas turbine engine of claim 5, wherein the sump includes a bearing.

7. The gas turbine engine of claim 5, wherein the at least one cooler includes an air-oil cooler and a fuel-oil cooler.

* * * * *